(12) United States Patent
    Speers et al.

(10) Patent No.: US 11,822,680 B1
(45) Date of Patent: Nov. 21, 2023

(54) SYSTEMS AND METHODS FOR SECURED COMPUTER OPERATIONS

(71) Applicant: IONIC SECURITY INC., Atlanta, GA (US)

(72) Inventors: Ryan Speers, Silver Spring, MD (US); Adam Ghetti, Atlanta, GA (US); Farzon Lotfi, Atlanta, GA (US); David Askew, Atlanta, GA (US); Kent Rollins, Atlanta, GA (US)

(73) Assignee: IONIC SECURITY INC., Atlanta, GA (US)

( * ) Notice: Subject to any disclaimer, the term of this patent is extended or adjusted under 35 U.S.C. 154(b) by 818 days.

(21) Appl. No.: 16/365,273

(22) Filed: Mar. 26, 2019

Related U.S. Application Data

(60) Provisional application No. 62/647,962, filed on Mar. 26, 2018.

(51) Int. Cl.
    | | |
    |---|---|
    | *G06F 21/62* | (2013.01) |
    | *G06F 9/54* | (2006.01) |
    | *G06F 9/445* | (2018.01) |

(52) U.S. Cl.
    CPC ............. *G06F 21/62* (2013.01); *G06F 9/543* (2013.01); *G06F 9/44526* (2013.01)

(58) Field of Classification Search
    None
    See application file for complete search history.

(56) References Cited

U.S. PATENT DOCUMENTS

| | | | | |
|---|---|---|---|---|
| 7,752,637 | B2 * | 7/2010 | Gunduc | G06F 9/54 |
| | | | | 719/330 |
| 8,245,289 | B2 * | 8/2012 | Chahal | G06F 21/6218 |
| | | | | 726/17 |
| 8,701,181 | B2 * | 4/2014 | Chahal | G06F 21/577 |
| | | | | 726/17 |
| 8,909,775 | B2 * | 12/2014 | Tredoux | G06F 21/608 |
| | | | | 709/225 |
| 8,949,201 | B1 * | 2/2015 | Batchu | G06F 21/60 |
| | | | | 707/692 |
| 9,009,075 | B2 * | 4/2015 | Dominick | G16H 30/20 |
| | | | | 705/51 |
| 9,218,464 | B2 * | 12/2015 | Wicker | G06F 21/10 |
| 9,648,042 | B2 * | 5/2017 | Cho | H04L 63/10 |
| 10,331,471 | B1 * | 6/2019 | Viktorov | G06F 9/44526 |
| 2005/0204130 | A1 * | 9/2005 | Harris | G06F 21/10 |
| | | | | 713/165 |
| 2008/0104715 | A1 * | 5/2008 | Saka | H04N 1/32144 |
| | | | | 726/31 |

(Continued)

*Primary Examiner* — Umut Onat
(74) *Attorney, Agent, or Firm* — Morris, Manning & Martin, LLP; Daniel E. Sineway, Esq.; Adam J. Thompson, Esq.

(57) ABSTRACT

Systems and methods for intercepting an operation requested by a user (e.g., print a document, cut text, copy an image, paste a hyperlink, embed an audio clip, save as a document in a new location, etc.) and performing one or more actions based on the level of security associated with the originating program, originating file, intended program, and/or intended file for that operation. As such, the disclosed systems and methods may enable consistent data security to be applied to a particular data item regardless of the location of that data item or the operations performed on the same.

19 Claims, 3 Drawing Sheets

EXEMPLARY PASTE/EMBED PROCESS

(56) References Cited

U.S. PATENT DOCUMENTS

| | | | | |
|---|---|---|---|---|
| 2010/0053302 A1* | 3/2010 | Ivashin | ................. | H04N 7/147 |
| | | | | 348/14.08 |
| 2014/0214683 A1* | 7/2014 | Dominick | .............. | G16H 30/20 |
| | | | | 705/51 |
| 2014/0267339 A1* | 9/2014 | Dowd | ..................... | G06F 9/543 |
| | | | | 709/219 |
| 2014/0304761 A1* | 10/2014 | Wicker | .................. | G06F 21/10 |
| | | | | 726/1 |
| 2015/0033305 A1* | 1/2015 | Shear | ..................... | G06F 21/53 |
| | | | | 726/11 |
| 2015/0271296 A1* | 9/2015 | Borzycki | ............. | H04L 67/104 |
| | | | | 709/202 |
| 2016/0092690 A1* | 3/2016 | Kim | ....................... | G06F 21/78 |
| | | | | 726/27 |
| 2017/0235965 A1* | 8/2017 | Balinsky | .............. | G06F 21/604 |
| | | | | 726/1 |

* cited by examiner

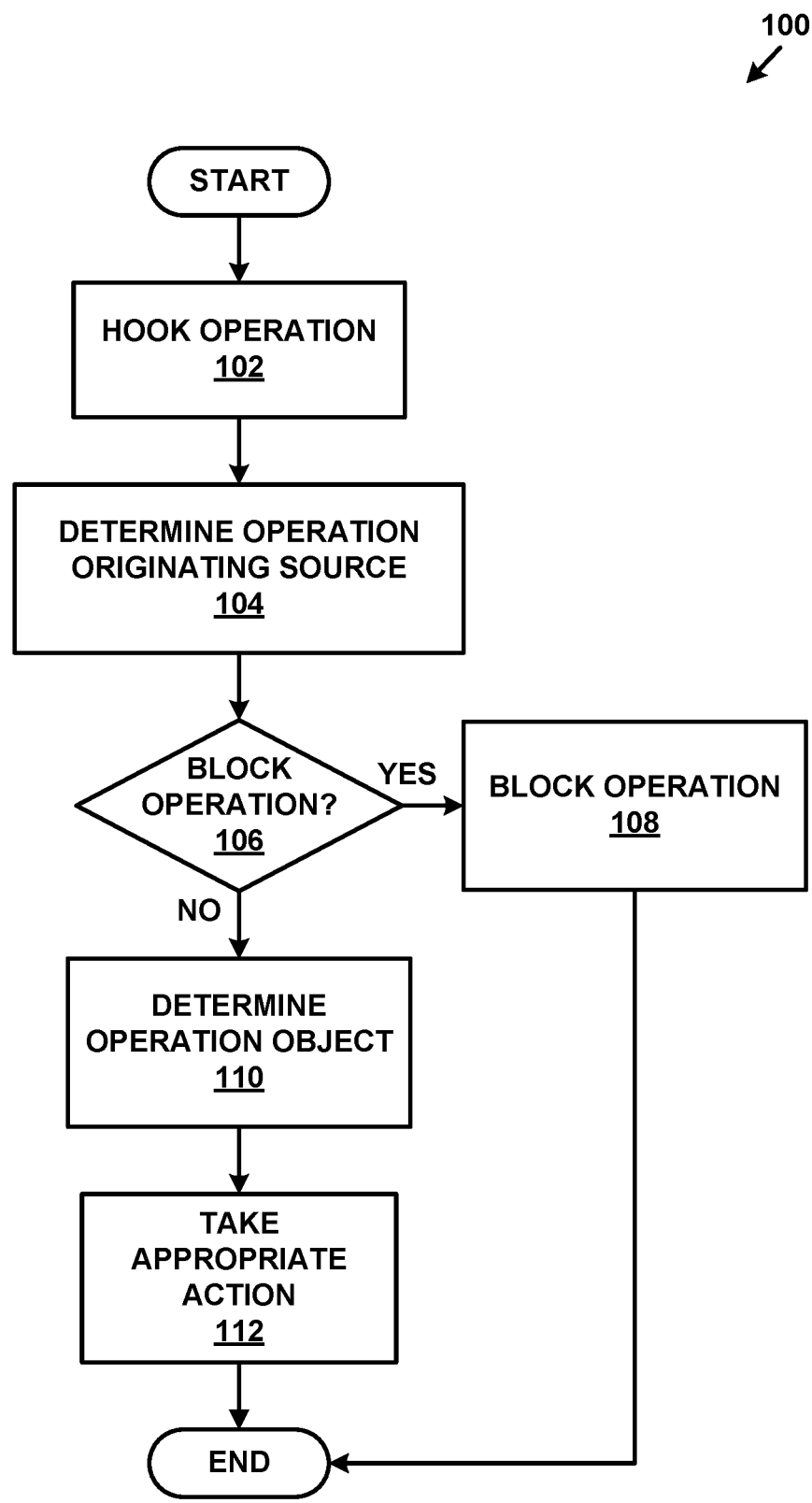
*FIG 1:* EXEMPLARY CUT/COPY PROCESS

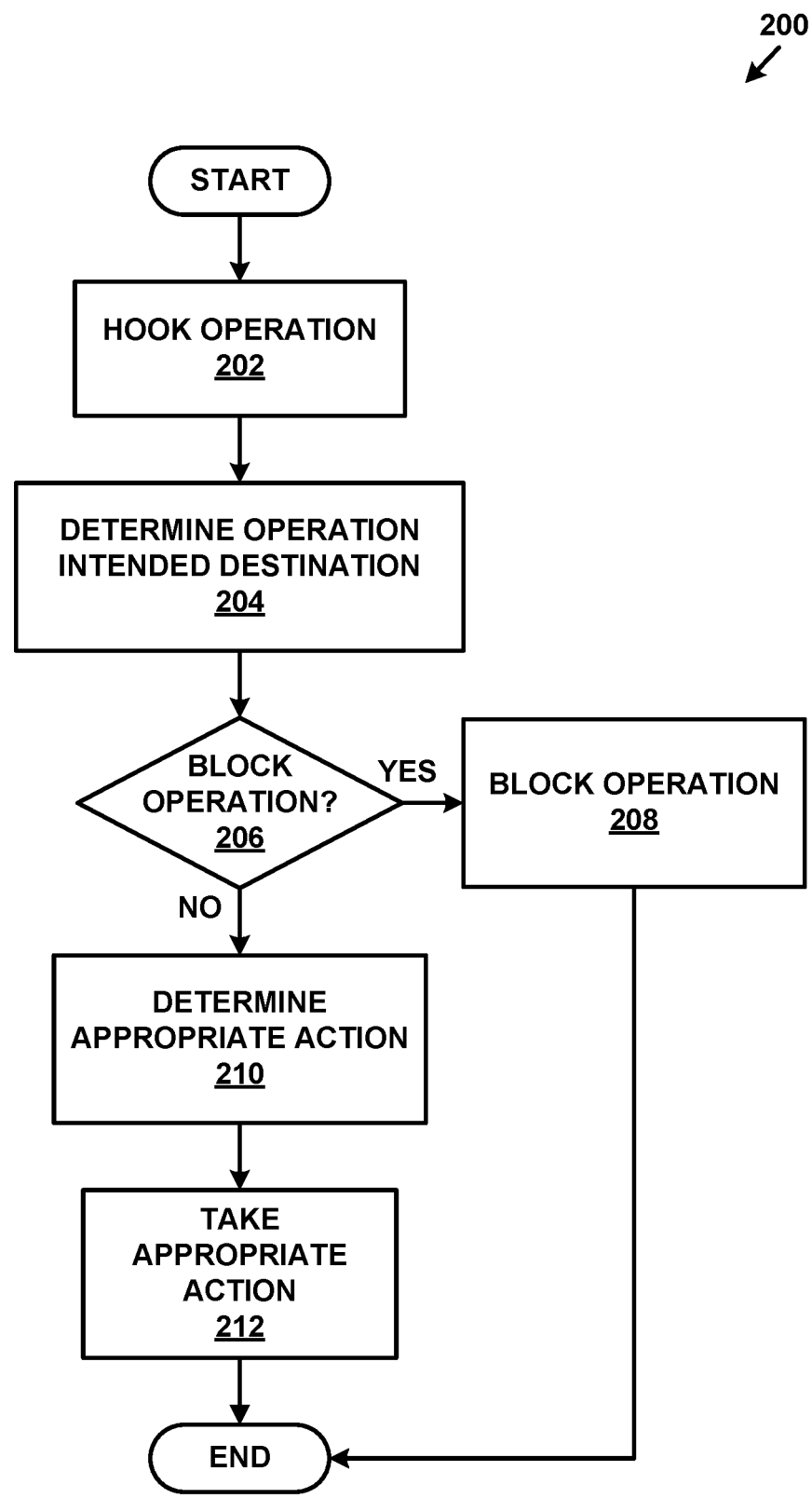
*FIG 2:* EXEMPLARY PASTE/EMBED PROCESS

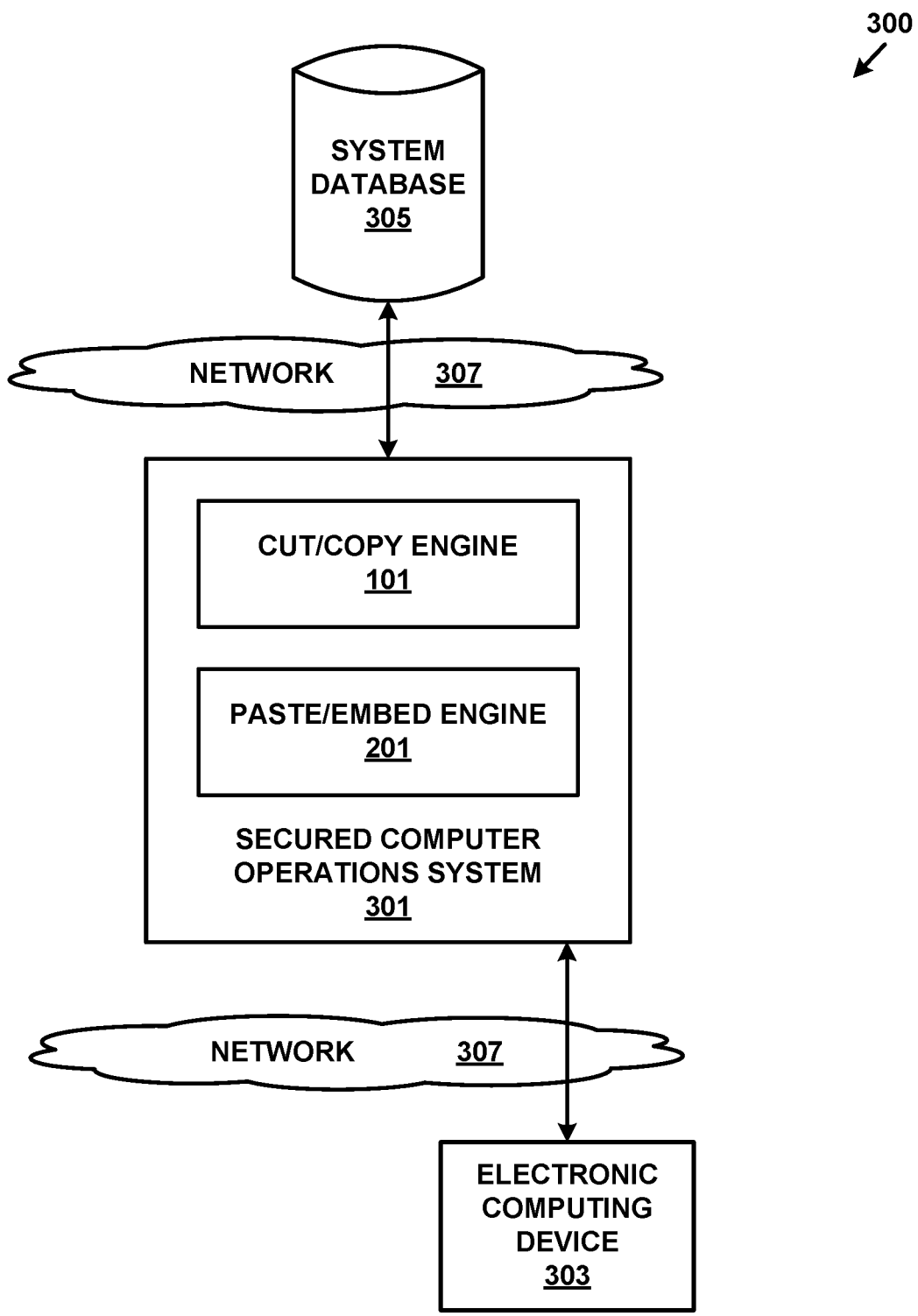
FIG 3: EXEMPLARY SYSTEM ARCHITECTURE

SYSTEMS AND METHODS FOR SECURED COMPUTER OPERATIONS

CROSS REFERENCE TO RELATED APPLICATIONS

This application claims priority to, the benefit under 35 U.S.C. § 119 of, and incorporates by reference herein in its entirety U.S. Provisional Patent Application No. 62/647,962, filed Mar. 26, 2018, and entitled "Systems and Methods for Secured Computer Operations."

TECHNICAL FIELD

The present systems and methods relate generally to information security and, more particularly, to securing computer operations.

BACKGROUND

Modern information technology offers a growing number of tools and services to increase business productivity, including productivity software, mobile devices, browser-based applications, cloud computing and storage, and web-based collaboration systems. However, each new capability brings new risks. Many of these tools and services allow users to easily move sensitive information between them, which can result in the data being stored in new locations (e.g., different files, cloud data repositories, software as a service applications, mobile devices, etc.) and/or with different technologies (e.g., encrypted, unencrypted, etc.). Further, many of these tools (and mechanisms for transferring data between them) do not carry attributes or context with the data or information in question, which makes tracking data movement and consistently applying data security impossible.

Therefore, there is a long-felt but unresolved need for a system or method that secures computer operations to track data movement and consistently apply data security to that data.

BRIEF SUMMARY OF THE DISCLOSURE

Briefly described, and according to one embodiment, aspects of the present disclosure generally relate to systems and methods for securing computer operations to track data movement and consistently apply data security to that data.

In various embodiments, the processes disclosed herein permit a system to intercept an operation requested by a user (e.g., print a document, cut text, copy an image, paste a hyperlink, embed an audio clip, save as a document in a new location, share a document via a web service, etc.) and perform one or more actions based on the level of security associated with the originating program, originating file, intended program, and/or intended file for that operation. For example, if a user attempts to copy restricted information from a first document and paste it into an unsecured document (e.g., moving sensitive data from a controlled environment to an uncontrolled environment), then the system may intercept that copy command and prevent the program from inserting the restricted information onto the clipboard so that the restricted information cannot be later pasted into the unsecured document (or modify the restricted information in a manner that prevents it from being pasted into the unsecured document; for example, by placing the restricted information in a particular location in the clipboard so it can only be retrieved when authorized or by encrypting the restricted information before placing it in the clipboard). In contrast, if the user attempts to copy restricted information from that first document and paste it into a text box in a secured web application (e.g., moving sensitive data from a controlled environment to another controlled environment), then the system may intercept that paste command and allow the program to access the restricted information on the clipboard so that the restricted information can be pasted into the secured document (or, in one embodiment, decrypt the information before pasting it). In one embodiment, the system may permit a copy command but may block/modify the paste command if the intended destination is not secured.

The disclosed systems and methods, in various embodiments, gather context from the user's interactions with data or other information via the user copying, cutting, moving, pasting, uploading, saving, printing, or similar operations. The context gathered generally may be used for making decisions on securing or encrypting data or other information or labeling the data based on said context according to one or more policies. In one embodiment, the context is gathered based on the user's interactions with software features in existing or custom programs; the gathered context may be stored in files, on the user's device, in a key or policy management system, or in another format. The system generally allows flexible rule-sets to be applied based on the administrator's preferences, programs in use, the data or documents in question (or a portion thereof), and the user's behavior.

Generally, even if data is stored in a secure medium and/or governed by appropriate security or privacy controls, it is important to be able to track and control data movement between programs or modalities, as well as tracking the context of that movement (e.g., user, application, time, method, etc.), to maintain the security of that data (e.g., preventing it from being moved to an unsecured environment, etc.). Further, it is important to carry the context of the original location of the data (e.g., document, classification, other attributes, original author, etc.) to the new location of the data so that the data continues to receive the same security/privacy controls. In various embodiments, the disclosed systems and methods improve data security by: 1) enforcing controls over operations (e.g., cut, copy, drag-n-drop, paste, embed, object linking & embedding ("OLE"), etc.); 2) conducting logging of said operations; and/or 3) carrying context from an originating file or data source along with the selected data during said operations to the intended destination of the selected data; which allows for consistent security and/or management controls to be applied.

This disclosure generally places no limitations on the types of operations, objects of operations, originating/intended programs, and or originating/intended files on which the disclosed systems and methods may functions. For example, the disclosed systems and methods may permit operations to/from/between web applications (e.g., email services, social media platforms, customer relationship management platforms, banking systems, etc.), text boxes in web applications or installed software, spreadsheet software, word processing software, document management systems, banking software, etc. Similarly, the disclosed systems and methods may facilitate printing a document, cutting text, copying an image, pasting a hyperlink, embedding an audio clip, saving a document in a new location, OLE processes, etc.

In various embodiments, the disclosed systems and methods operate within the context of an encryption system that encrypts data and manages access to that encrypted data for a particular user, enterprise, and/or organization (an exemplary version of which is described in U.S. Pat. No. 9,224,000, entitled, "Systems and Methods for Providing Information Security Using Context-Based Keys," the disclosure of which is incorporated by reference herein). In various embodiments, that encryption system may comprise a distributed architecture with a cloud-based platform (an exemplary version of which is described in U.S. Pat. Nos. 9,614,670, 9,608,809, and 9,608,810, all entitled, "Systems and Methods for Encryption and Provision of Information Security Using Platform Services," the disclosures of which are incorporated by reference herein). In one embodiment, the encryption system operates as a plugin within the originating/intended program.

In one embodiment, a system comprising a plugin installed within a program, wherein the plugin is operative to: hook an operation to be performed on a particular item of data by the program; determine, based on the particular item of data and either a source of or destination for the particular item of data, a particular action to take with respect to the operation; and initiate the particular action with respect to the operation, wherein the particular action comprises permitting the operation to occur, modifying the operation, or modifying the particular item of data.

In one embodiment, a method, comprising the steps of: hooking an operation to be performed on a particular item of data; determining, based on the particular item of data and either a source of or destination for the particular item of data, a particular action to take with respect to the operation; and initiating the particular action with respect to the operation, wherein the particular action comprises permitting the operation to occur, modifying the operation, or modifying the particular item of data.

According to one aspect of the present disclosure, the system, wherein the operation is selected from the list comprising: cut the particular item of data, copy the particular item of data, paste the particular item of data, embed the particular item of data, print the particular item of data, save the particular item of data, save the particular item of data as a new item of data, upload the particular item of data, and share the particular item of data. Furthermore, the system, wherein the particular item of data comprises text, plaintext, cipher text, a file, a folder, a document, an image, an audio clip, a hyperlink, a spreadsheet, a cell, a presentation, or a slide. Moreover, the system, wherein, to determine the particular action to take, the plugin is further operative to compare the particular item of data and either the source of or the destination for the particular item of data to one or more policies defining which particular action to initiate with respect to the operation to determine which particular action to initiate. Further, the system, wherein the operation comprises copy the particular item of data, wherein the particular item of data comprises text from a first document opened by the program, and wherein the source of the particular item of data comprises the first document. Additionally, the system, wherein, to hook the operation, the plugin is further operative to: detect the operation; and intercept the operation before the text is stored in a clipboard of the program.

According to one aspect of the present disclosure, the system, wherein permitting the operation to occur comprises inserting the text into the clipboard, wherein modifying the operation comprises inserting the text into an unexpected position on the clipboard, and wherein modifying the particular item of data comprises encrypting the text before inserting the encrypted text into the clipboard. Also, the system, wherein the plugin is further operative to: hook a second operation to be performed on the particular item of data; determine, based on the particular item of data and the destination for the particular item of data, a second particular action to take with respect to the second operation; and initiate the second particular action with respect to the second operation, wherein the second particular action comprises permitting the second operation to occur or modifying the second operation. In addition, the system, wherein the second operation comprises paste the particular item of data from the clipboard into a second document opened by the program and wherein the destination for the particular item of data comprises the second document. Furthermore, the system, wherein permitting the second operation to occur comprises pasting the text from the clipboard and wherein modifying the second operation comprises pasting the text from the unexpected position on the clipboard. Moreover, the system, wherein the first document comprises first metadata, wherein the plugin is further operative to, after permitting the second operation to occur, associate the first metadata with the second document.

According to one aspect of the present disclosure, the method, wherein the operation is selected from the list comprising: cut the particular item of data, copy the particular item of data, paste the particular item of data, embed the particular item of data, print the particular item of data, save the particular item of data, save the particular item of data as a new item of data, upload the particular item of data, and share the particular item of data. Further, the method, wherein the particular item of data comprises text, plaintext, cipher text, a file, a folder, a document, an image, an audio clip, a hyperlink, a spreadsheet, a cell, a presentation, or a slide. Additionally, the method, wherein the step of determining further comprises comparing the particular item of data and either the source of or the destination for the particular item of data to one or more policies defining which particular action to initiate with respect to the operation to determine which particular action to initiate. Also, the method, wherein the operation comprises copy the particular item of data, wherein the particular item of data comprises text from a first document opened by a program, and wherein the source of the particular item of data comprises the first document. In addition, the method, wherein the step of hooking further comprises the steps of: detecting the operation; and intercepting the operation before the text is stored in a clipboard of the program.

According to one aspect of the present disclosure, the method, wherein permitting the operation to occur comprises inserting the text into the clipboard, wherein modifying the operation comprises inserting the text into an unexpected position on the clipboard, and wherein modifying the particular item of data comprises encrypting the text before inserting the encrypted text into the clipboard. Furthermore, the method, further comprising the steps of: hooking a second operation to be performed on the particular item of data; determining, based on the particular item of data and the destination for the particular item of data, a second particular action to take with respect to the second operation; and initiating the second particular action with respect to the second operation, wherein the second particular action comprises permitting the second operation to occur or modifying the second operation. Moreover, the method, wherein the second operation comprises paste the particular item of data from the clipboard into a second document opened by the program and wherein the destination for the particular item of data comprises the second document. Further, the method, wherein permitting the second operation to occur comprises pasting the text from the clipboard and wherein modifying the second operation comprises pasting the text from the unexpected position on the clipboard. Additionally, the method, wherein the first document comprises first metadata, further comprising the step of, after permitting the second operation to occur, associating the first metadata with the second document.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a flowchart showing an exemplary cut/copy process, according to one embodiment of the present disclosure.

FIG. 2 is a flowchart showing an exemplary paste/embed process, according to one embodiment of the present disclosure.

FIG. 3 is an exemplary system architecture, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for securing computer operations to track data movement and consistently apply data security to that data.

In various embodiments, the processes disclosed herein permit a system to intercept an operation requested by a user (e.g., print a document, cut text, copy an image, paste a hyperlink, embed an audio clip, save as a document in a new location, share a document via a web service, etc.) and perform one or more actions based on the level of security associated with the originating program, originating file, intended program, and/or intended file for that operation. For example, if a user attempts to copy restricted information from a first document and paste it into an unsecured document (e.g., moving sensitive data from a controlled environment to an uncontrolled environment), then the system may intercept that copy command and prevent the program from inserting the restricted information onto the clipboard so that the restricted information cannot be later pasted into the unsecured document (or modify the restricted information in a manner that prevents it from being pasted into the unsecured document; for example, by placing the restricted information in a particular location in the clipboard so it can only be retrieved when authorized or by encrypting the restricted information before placing it in the clipboard). In contrast, if the user attempts to copy restricted information from that first document and paste it into a text box in a secured web application (e.g., moving sensitive data from a controlled environment to another controlled environment), then the system may intercept that paste command and allow the program to access the restricted information on the clipboard so that the restricted information can be pasted into the secured document (or, in one embodiment, decrypt the information before pasting it). In one embodiment, the system may permit a copy command but may block/modify the paste command if the intended destination is not secured.

The disclosed systems and methods, in various embodiments, gather context from the user's interactions with data or other information via the user copying, cutting, moving, pasting, uploading, saving, printing, or similar operations. The context gathered generally may be used for making decisions on securing or encrypting data or other information or labeling the data based on said context according to one or more policies. In one embodiment, the context is gathered based on the user's interactions with software features in existing or custom programs; the gathered context may be stored in files, on the user's device, in a key or policy management system, or in another format. The system generally allows flexible rule-sets to be applied based on the administrator's preferences, programs in use, the data or documents in question (or a portion thereof), and the user's behavior.

Generally, even if data is stored in a secure medium and/or governed by appropriate security or privacy controls, it is important to be able to track and control data movement between programs or modalities, as well as tracking the context of that movement (e.g., user, application, time, method, etc.), to maintain the security of that data (e.g., preventing it from being moved to an unsecured environment, etc.). Further, it is important to carry the context of the original location of the data (e.g., document, classification, other attributes, original author, etc.) to the new location of the data so that the data continues to receive the same security/privacy controls. In various embodiments, the disclosed systems and methods improve data security by: 1) enforcing controls over operations (e.g., cut, copy, drag-n-drop, paste, embed, object linking & embedding ("OLE"), etc.); 2) conducting logging of said operations; and/or 3) carrying context from an originating file or data source along with the selected data during said operations to the intended destination of the selected data; which allows for consistent security and/or management controls to be applied.

This disclosure generally places no limitations on the types of operations, objects of operations, originating/intended programs, and or originating/intended files on which the disclosed systems and methods may functions. For example, the disclosed systems and methods may permit operations to/from/between web applications (e.g., email services, social media platforms, customer relationship management platforms, banking systems, etc.), text boxes in web applications or installed software, spreadsheet software, word processing software, document management systems, banking software, etc. Similarly, the disclosed systems and methods may facilitate printing a document, cutting text, copying an image, pasting a hyperlink, embedding an audio clip, saving a document in a new location, OLE processes, etc.

In various embodiments, the disclosed systems and methods operate within the context of an encryption system that encrypts data and manages access to that encrypted data for a particular user, enterprise, and/or organization (an exemplary version of which is described in U.S. Pat. No. 9,224,000, entitled, "Systems and Methods for Providing Information Security Using Context-Based Keys," the disclosure of which is incorporated by reference herein). In various embodiments, that encryption system may comprise a distributed architecture with a cloud-based platform (an exemplary version of which is described in U.S. Pat. Nos. 9,614,670, 9,608,809, and 9,608,810, all entitled, "Systems and Methods for Encryption and Provision of Information Security Using Platform Services," the disclosures of which are incorporated by reference herein). In one embodiment, the encryption system operates as a plugin within the originating/intended program.

Exemplary Embodiments

Referring now to the figures, for the purposes of example and explanation of the fundamental processes and components of the disclosed systems and methods, reference is made to FIG. 1, which is a flowchart showing an exemplary cut/copy process 100, according to one embodiment of the present disclosure. As will be understood and appreciated, the exemplary cut/copy process 100 shown in FIG. 1 represents merely one approach or embodiment of the present system, and other aspects are used according to various embodiments of the present system. Further, as will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown. Moreover, although the process 100 is referred to as the cut/copy process, the process 100 may refer to any number of commands/operations requested by a user and not just cut/copy (e.g., print a document, cut text, copy an image, upload a file, save a file, etc.).

In various embodiments, the exemplary cut/copy process 100 is the process by which the system intercepts an operation requested by a user (e.g., print a document, cut text, copy an image, upload a file, save a file, etc.) and performs one or more actions based on the level of security associated with the originating program and/or originating file (or portion of that originating file) for that operation. For example, if a user attempts to copy restricted information from a first document and paste it into an unsecured document (e.g., moving sensitive data from a controlled environment to an uncontrolled environment), then the system may intercept that copy command and prevent the program from inserting the restricted information onto the clipboard so that the restricted information cannot be later pasted into the unsecured document. Or, in some embodiments, rather than preventing the program from inserting the restricted information into the clipboard, the present system may simply log the request to copy the restricted information (e.g., by whom the request was made, the location/time, the specific information being copied, etc.) and may allow the copy operation to continue. In contrast, if the user attempts to copy restricted information from a secured web application (e.g., email service, customer relationship management platform, etc.) and paste it into a secured document (e.g., moving sensitive data from a controlled environment to another controlled environment), then the system may intercept that copy command but allow the program to insert the restricted information onto the clipboard so that the restricted information can be later pasted into the secured document.

Generally, the exemplary cut/copy process 100 begins immediately after a user selects text and/or an object (e.g., image, file, audio clip, hyperlink, etc.) and initiates a copy and/or cut operation on that selected data, wherein at step 102, in various embodiments, the system hooks the initiated operation to secure the same. Generally, in one embodiment, to hook the initiated operation, the system recognizes that the operation has been selected by the user and intercepts the operation to perform one or more actions on the selected data before the operation is completed (e.g., before the data is placed into the clipboard associated with the operating system and/or originating program, etc.). In some embodiments, the system includes a list of predetermined actions and the corresponding codes/instructions in an underlying program such that, when one of the actions is initiated, the system will recognize the same and initiate the hook operation 102. In certain embodiments, every action taken by a system user is compared to the predetermined list of relevant actions to identify ones that might be appropriate for a hooking operation.

In one embodiment, instead of hooking the initiated operation, the system may be integrated with the operation such that upon initiating the operation, the system automatically jumps to step 104 to determine how to handle the initiated operation. In various embodiments, at step 104, the system determines the originating program (e.g., the program from which the data is being cut/copied; for example, web browser, word processor, spreadsheet, etc.) and/or originating file for the operation (e.g., the file from which the data is being cut/copied; for example, encrypted file, unencrypted file, etc.). Thus, at step 106, in various embodiments, the system compares the determined operation originating source to one or more policies to decide whether to block the initiated operation (e.g., because the user is not authorized to copy data from that originating program, because copying data from the originating file is prohibited, etc.). In various embodiments, the policies may be predetermined and downloaded/pushed down to the system prior to the initiation of process 100. In other embodiments, the policies may be provided/pushed to the system in real time (as the system is determining how to respond to a particular initiated operation—as will occur to one having ordinary skill in the art, these policies may be specifically tailored/provided based upon the determined attributes of the particular initiated operation). In yet other embodiment, the policies are maintained in the cloud or otherwise managed by a policy engine that receives requests from the system, as part of step 106, and provides a response as to how to handle the initiated operation.

If the system decides to block the operation (e.g., the user is associated with a policy that prohibits that operation from that particular originating source, etc.), then, in one embodiment at step 108, the system blocks the operation. Generally, blocking the operation may occur in any manner—deleting the operation, bypassing/skipping the operation, removing the selected data from the operation (e.g., so that it copies/cuts no data into the clipboard, etc.), displaying an error message, logging the initiated operation and any other relevant metadata (e.g., user, time, file, etc.) for subsequent auditing purposes or analysis by a data security software/team, etc. If, however, the system decides not to block the operation (e.g., the user is associated with a policy that does not prohibit that operation from that particular originating source, etc.), then, in one embodiment at step 110, the system determines the object of the operation (e.g., text, image, hyperlink, etc.) and its associated types (e.g., plaintext, formatted text, etc.) so that the system may take the appropriate action with respect to the same.

At step 112, in various embodiments, the system takes the appropriate action based upon the determined object of the operation and its associated types. For example, the system, at step 112 in various embodiments, may check one or more policies associated with the requesting user, originating source, and/or object of the operation to perform any one or more of the following actions: 1) permit the object of the operation to be inserted in its intended destination (e.g., clipboard, etc.); 2) insert an empty record into the normal location of the intended destination (e.g., in the clipboard in the first position, etc.); 3) insert a message that the system has protected the operation into the normal location of the intended destination; 4) insert the object of the operation into a destination where a standard program would not look for it (e.g., in the clipboard in a second, third, fourth, etc. position so that the program, effectively, cannot access the data); 5) encrypt the object and insert the resulting ciphertext into the normal location of the intended destination; and 6) log the initiated operation, appropriate action taken, and any other relevant metadata (e.g., user, time, file, etc.) for subsequent auditing purposes or analysis by a data security software/team. In various embodiments, the system, at step 112, may also insert metadata along with the object or ciphertext (e.g., identifiers of the originating file; marking/attributes of the originating file—classification, create date, etc.; etc.). In one embodiment, at step 112, the system replaces the object of the operation with any of the data items mentioned previously (e.g., nothing, a message, ciphertext, etc.) and permits the operating system and/or originating program to complete the operation (e.g., by inserting the replaced data item into the normal location, etc.).

After step 112, in various embodiments, the exemplary cut/copy process 100 ends thereafter.

Now referring to FIG. 2, a flowchart of an exemplary paste/embed process 200 is shown according to one embodiment of the present disclosure. In various embodiments, the exemplary paste/embed process 200 is the process by which the system intercepts an operation requested by a user (e.g., paste text, embed an image, upload a file, save a file, etc.) and performs one or more actions based on the level of security associated with the intended program and/or intended file for that operation. For example, if a user attempts to copy restricted information from a first document and paste it into a text box in an unsecured web application (e.g., moving sensitive data from a controlled environment to an uncontrolled environment), then the system may intercept that paste command and prevent the program from accessing the restricted information on the clipboard so that the restricted information cannot be pasted into the unsecured web application. In contrast, if the user attempts to copy restricted information from that first document and paste it into a secured document (e.g., moving sensitive data from a controlled environment to another controlled environment), then the system may intercept that paste command but allow the program to access the restricted information on the clipboard so that the restricted information can be pasted into the secured document. Moreover, although the process 200 is referred to as the paste/embed process, the process 200 may refer to any number of commands/operations requested by a user and not just paste/embed (e.g., paste text, embed an image, upload a file, save a file, etc.).

Generally, the exemplary paste/embed process 200 begins immediately after a user initiates a paste and/or embed operation, wherein at step 202, in various embodiments, the system hooks the initiated operation to secure the same. Generally, in one embodiment, to hook the initiated operation, the system recognizes that the operation has been selected by the user and intercepts the operation to perform one or more actions on the intended data before the operation is completed (e.g., before the data is placed into the intended file, etc.). In one embodiment, instead of hooking the initiated operation, the system may be integrated with the operation such that upon initiating the operation, the system automatically jumps to step 204 to determine how to handle the initiated operation. In various embodiments, at step 204, the system determines the intended program (e.g., the program into which the data is being pasted/embedded; for example, web browser, word processor, spreadsheet, etc.) and/or intended file for the operation (e.g., the file into which the data is being pasted/embedded; for example, encrypted file, unencrypted file, etc.). Thus, at step 206, in various embodiments, the system compares the determined operation intended destination to one or more policies to decide whether to block the initiated operation (e.g., because the user is not authorized to paste data into that intended program, because pasting data into the intended file is prohibited, etc.).

In various embodiments, the policies may be predetermined and downloaded/pushed down to the system prior to the initiation of process 200. In other embodiments, the policies may be provided/pushed to the system in real time (as the system is determining how to respond to a particular initiated operation—as will occur to one having ordinary skill in the art, these policies may be specifically tailored/provided based upon the determined attributes of the particular initiated operation). In yet other embodiment, the policies are maintained in the cloud or otherwise managed by a policy engine that receives requests from the system, as part of step 206, and provides a response as to how to handle the initiated operation.

If the system decides to block the operation (e.g., the user is associated with a policy that prohibits that operation from that particular intended destination, etc.), then, in one embodiment at step 208, the system blocks the operation. Generally, blocking the operation may occur in any manner—deleting the operation, bypassing/skipping the operation, preventing access to the intended data from the operation (e.g., so that it pastes/embeds no data from the clipboard, etc.), displaying an error message, displaying a message that the system has protected or denied the operation, logging the initiated operation and any other relevant metadata (e.g., user, time, file, etc.) for subsequent auditing purposes or analysis by a data security software/team, etc. If, however, the system decides not to block the operation (e.g., the user is associated with a policy that does not prohibit that operation into that particular intended destination, etc.), then, in one embodiment at step 210, the system determines the appropriate action to take with respect to the operation by checking one or more policies associated with the requesting user, originating source, intended destination, and/or object of the operation.

At step 212, in various embodiments, the system takes the appropriate action based upon the determined object of the operation and its associated types. For example, the system, at step 212 in various embodiments, may perform any one or more of the following actions: 1) permit the object of the operation to be inserted in its intended destination (e.g., intended file, intended program, etc.); 2) insert ciphertext (corresponding to an encrypted version of the object of the operation) into its intended destination; 3) decrypt the object of the operation and insert the resulting plaintext into its intended destination; and 4) log the initiated operation, appropriate action taken, and any other relevant metadata (e.g., user, time, file, etc.) for subsequent auditing purposes or analysis by a data security software/team. In various embodiments, the system, at step 212, may also change the classification or other attributes of the intended destination based on the originating source of the object of the operation (e.g., changing an unrestricted file to a restricted file, encrypting an unencrypted file, marking the destination as containing the new data, etc.) so that the object receives the same level of data security in the intended destination that it did in its originating source. As such, the system may update the context of the intended destination to contain the same or similar metadata as the originating source. In some embodiments, the system may also update additional attributes of the intended destination (e.g., indicating who pasted the data, when it was pasted, where it came from, etc.).

After step 212, in various embodiments, the exemplary paste/embed process 200 ends thereafter.

Referring now to FIG. 3, an exemplary architecture 300 of one embodiment of the disclosed system is shown. The exemplary architecture 300 in FIG. 3 is shown for illustrative purposes only and could comprise only one engine, module, or collection of code, etc. In various embodiments, a secured computer operations system 101 comprises a cut/copy engine 101 and a paste/embed engine 201 and is operatively connected to an electronic computing device 303 and a system database 305 via network 307 to conduct the processes disclosed herein. Generally, network 307 may be any connection capable of transferring data between two or more computer systems (e.g., a secure or unsecured connection, Bluetooth, wireless or wired local-area networks (LANs), cell network, the Internet, etc.). Accordingly, the disclosed systems and methods permit interception of an operation requested by a user (e.g., print a document, cut text, copy an image, paste a hyperlink, embed an audio clip, save as a document in a new location, share a document via a web service, etc.) and performance of one or more actions based on the level of security associated with the originating program, originating file, intended program, and/or intended file for that operation (e.g., allowing the operation, blocking the operation, altering the operation, recording information regarding the operation, etc.).

Generally, the electronic computing device 303 is any device that is capable of performing the functionality disclosed herein (e.g., desktop computer, laptop computer, tablet computer, smartphone, file management system, encrypted data storage system, enterprise data security system, encryption system, search management system, etc.). In various embodiments, the electronic computing device 303 communicates via network 307 with the secured computer operations system 301 to intercept operations requested on the electronic computing device 303 and perform actions on the same. In one embodiment, not shown in FIG. 3, the electronic computing device 303 comprises the secured computer operations system 301 (e.g., the secured computer operations system 301 is installed on the electronic computing device 303, etc.). Generally, the originating program and intended program may be running on the electronic computing device 303.

In various embodiments, the secured computer operations system 301 (and its engines) may be any computing device (e.g., desktop computer, laptop, servers, tablets, etc.), combination of computing devices, software, hardware, or combination of software and hardware that is capable of performing the functionality disclosed herein. In one embodiment, not shown in FIG. 3, the secured computer operations system 301 comprises a third party system (e.g., a software plugin, etc.) that is installed on the electronic computing device 303 and interacts with an originating program (e.g., the program that initiates the originating action/operation, etc.) on the electronic computing device 303. In other embodiments, the secured computer operations system 301 is embedded within the originating program and the intended program. In yet other embodiments, the secured computer operations system 301 is installed in the kernel of the operating system on the electronic computing device 303. Generally, the secured computer operations system 301 communicates via network 307 with the system database 305 and/or electronic computing device 303 to conduct the processes disclosed herein. In one embodiment, not shown in FIG. 3, the secured computer operations system 301 need not communicate via network 307 with the system database 305 and/or electronic computing device 303 (e.g., when the system 301 is installed on the electronic computing device 303) and, instead, it may communicate via network 307 with a policy engine.

In various embodiments, the secured computer operations system 301 may comprise the cut/copy engine 101 and paste/embed engine 201. In one embodiment, the cut/copy engine 101 conducts the cut/copy process 100. The paste/embed engine 201, in one embodiment, conducts the paste/embed process 200. In one embodiment, the cut/copy engine 101 and the paste/embed engine 201 are the same such that the cut/copy process 100 and the paste/embed process 200 are the same process (or run concurrently), depending on the requested operation (e.g., save a file, upload a document, etc.).

The system database 305, in various embodiments, may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the system database 305 is local to the secured computer operations system 301 (e.g., secured computer operations system 301 comprises the system database 305). In one embodiment, the system database 305 is local to the electronic computing device 303. In other embodiments, the system database 305 is virtual or stored in the "cloud." In one embodiment, the system database 305 communicates via network 4307 with the secured computer operations system 301 to facilitate the processes disclosed herein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A system, comprising:
    at least one computing device comprising a processor;
    a memory storing a plugin installed within a program that, when executed by the at least one computing device, causes the at least one computing device to:
        hook at least two operations comprising a copy operation and a paste operation to be performed on a particular item of data by the program;
        determine, based on the particular item of data, a source of the particular item of data, and a first attribute of the source of the particular item of data, wherein the first attribute comprises at least one first security setting, a particular action to take with respect to the copy operation;
        initiate the particular action with respect to the copy operation, wherein the particular action comprises generating a modified copy operation for the copy operation, wherein the modified copy operation comprises encrypting the particular item being copied;
        determine, based on the particular item of data, a destination for the particular item of data, and a second attribute of the destination of the particular item of data, wherein the second attribute comprises at least one second security setting, a second particular action to take with respect to the paste operation;
        initiate the second particular action with respect to the paste operation, wherein the second particular action comprises generating a modified paste operation for the paste operation, wherein the modified paste operation comprises inserting an empty record into the destination for the particular item of data and decrypting the particular item being pasted;
        determining a modification of the at least one second security setting of the second attribute of the destination of the particular item of data based on the at least one first security setting of the first attribute of the source of the particular item of data by applying a policy; and
        performing the modification to the second attribute of the destination for the particular item of data.

2. The system of claim 1, wherein the at least two operations further comprise at least one of: cut the particular item of data, embed the particular item of data, print the particular item of data, save the particular item of data, save the particular item of data as a new item of data, upload the particular item of data, and share the particular item of data.

3. The system of claim 1, wherein, to determine the particular action to take, the plugin is further operative to compare the particular item of data and either the source of or the destination for the particular item of data to one or more policies defining which particular action to initiate with respect to one of the at least two operations to determine which particular action to initiate.

4. The system of claim 1, wherein the modified copy operation comprises copy the particular item of data, wherein the particular item of data comprises text from a first document opened by the program, and wherein the source of the particular item of data comprises the first document.

5. The system of claim 4, wherein, to hook the copy operation, the plugin is further operative to:
    detect the copy operation; and
    intercept the copy operation before text is stored in a clipboard of the program.

6. The system of claim 5, wherein the modified copy operation comprises inserting the text into an unexpected position on the clipboard.

7. The system of claim 6, wherein the modified paste operation comprises pasting the particular item of data from the clipboard into a second document opened by the program and wherein the destination for the particular item of data comprises the second document.

8. The system of claim 7, wherein the modified paste operation comprises pasting the text from the unexpected position on the clipboard.

9. The system of claim 8, wherein the first document comprises first metadata, wherein the plugin is further operative to, after the modified paste operation occurs, associate the first metadata with the second document.

10. The system of claim 1, wherein the modified paste operation comprises inserting a message into the destination for the particular item of data that the system protected the modified paste operation.

11. A method, comprising the steps of:
    hooking at least two operations comprising a copy operation and a paste operation to be performed on a particular item of data;
    determining, based on the particular item of data, a source of the particular item of data, and a first attribute of the source of the particular item of data, wherein the first attribute comprises at least one first security setting, a particular action to take with respect to the copy operation;
    initiating the particular action with respect to the copy operation, wherein the particular action comprises generating a modified copy operation wherein the modified copy operation comprises encrypting the particular item being copied;
    determining, based on the particular item of data, a destination for the particular item of data, and a second attribute of the destination of the particular item of data, wherein the second attribute comprises at least one second security setting, a second particular action to take with respect to the paste operation; and
    initiating the second particular action with respect to the paste operation, wherein the second particular action comprises generating a modified paste operation, wherein the modified paste operation comprises inserting an empty record into the destination for the particular item of data and decrypting the particular item being pasted;

determining a modification of the at least one second security setting of the second attribute of the destination of the particular item of data based on the at least one first security setting of the first attribute of the source of the particular item of data by applying a policy; and performing the modification to the second attribute of the destination for the particular item of data.

12. The method of claim 11, wherein the at least two operations further comprise one of: cut the particular item of data, embed the particular item of data, print the particular item of data, save the particular item of data, save the particular item of data as a new item of data, upload the particular item of data, and share the particular item of data.

13. The method of claim 11, wherein the step of determining further comprises comparing the particular item of data and either the source of or the destination for the particular item of data to one or more policies defining which particular action to initiate with respect to one of the at least two operations to determine which particular action to initiate.

14. The method of claim 11, wherein the modified copy operation comprises copy the particular item of data, wherein the particular item of data comprises text from a first document opened by a program, and wherein the source of the particular item of data comprises the first document.

15. The method of claim 14, wherein the step of hooking further comprises the steps of:

detecting the copy operation; and intercepting the copy operation before text is stored in a clipboard of the program.

16. The method of claim 15, wherein the modified copy operation comprises inserting text into an unexpected position on the clipboard.

17. The method of claim 16, wherein the modified paste operation comprises paste the particular item of data from the clipboard into a second document opened by the program and wherein the destination for the particular item of data comprises the second document.

18. The method of claim 17, wherein the modified paste operation comprises pasting the text from the unexpected position on the clipboard.

19. The method of claim 18, wherein the first document comprises first metadata, further comprising the step of, after the modified paste operation occurs, associating the first metadata with the second document.

* * * * *